United States Patent
Siksai

[11] 3,731,996
[45] May 8, 1973

[54] ANIMATED DISPLAY SYSTEM

[76] Inventor: Anthony Siksai, 2705 Lahser Rd., Bloomfield Hills, Mich. 48013

[22] Filed: Dec. 27, 1971

[21] Appl. No.: 211,861

[52] U.S. Cl. ....................352/87, 350/158, 352/50
[51] Int. Cl. .............................................G03b 21/32
[58] Field of Search ..................352/50, 87; 350/158, 350/157, 159

[56] References Cited

UNITED STATES PATENTS

| | | | |
|---|---|---|---|
| 2,700,919 | 2/1955 | Boone | 352/87 X |
| 744,778 | 11/1903 | Menchen | 352/87 |
| 3,609,003 | 9/1971 | Siksai | 350/157 |

*Primary Examiner*—Samuel S. Matthews
*Assistant Examiner*—Monroe H. Hayes
*Attorney*—Joseph M. Lane et al.

[57] ABSTRACT

A system for animating a picture illuminated by a light source. The system includes a rotary sheet of material having linearly oriented molecules and a lens element of optically inactive material angularly positioned in the path of light from said light source for producing the animation.

14 Claims, 7 Drawing Figures

PATENTED MAY 8 1973 3,731,996

INVENTOR
ANTHONY SIKSAI

BY *Lane, Aitken, Dunner & Ziems*
ATTORNEYS

INVENTOR
ANTHONY SIKSAI

BY Lane, Aitken, Dunner & Ziems
ATTORNEYS

ANIMATED DISPLAY SYSTEM

BACKGROUND OF THE INVENTION

This invention relates to a system for animating illuminated pictures, and particularly to a system for animating pictures projected on a surface by an overhead or slide projector.

A prior art system for animating illuminated pictures, including those projected on a wall by a projector, is disclosed in my earlier U.S. Pat. No. 3,437,401 granted on Apr. 8, 1969 and entitled "Light Intercepting Sheet for an Illuminated Display Device." Other prior art systems for producing animations are disclosed in the U.S. Pat. to Burchell, et al No. 2,393,968 granted on Feb. 5, 1946 and the U.S. Pat. to Yates No. 3,054,204 granted on Sept. 18, 1962.

Each of these prior art patents discloses a different type of light intercepting motion sheet for producing the animation. However, all three patents disclose rotary polarizers which cooperate with the aforementioned motion sheets to produce traveling shadows on the illuminated picture which create the illusion of motion.

The polarized material of the rotary polarizers blocks out almost half of the light passing therethrough. This, in combination with the reduction in light caused by the other sheets or layers needed for producing the animation, reduces the brightness of the picture being animated. This reduction in light is particularly troublesome when animating pictures projected by conventional overhead or slide projectors. In order to obtain a picture of the desired quality, the projector must have a much more powerful light source than would ordinarily be provided.

SUMMARY OF THE PRESENT INVENTION

In accordance with the present invention, the rotary polarizer of the prior art systems is replaced with a rotary sheet or disc of birefringent material which allows much more light to pass through, and a lens element having a layer of optically inactive material, such as clear glass or transparent plastic, is positioned at an acute angle relative to the light passing therethrough. The two elements allow more light to pass through and produce a much brighter animated picture as compared to the prior art systems employing the rotary polarizers.

Other objects and features of novelty of the invention will become apparent to one skilled in the art when referred to the following description, taken in conjunction with the accompanying drawings wherein:

DESCRIPTION OF THE PREFERRED EMBODIMENTS

Figure 1:
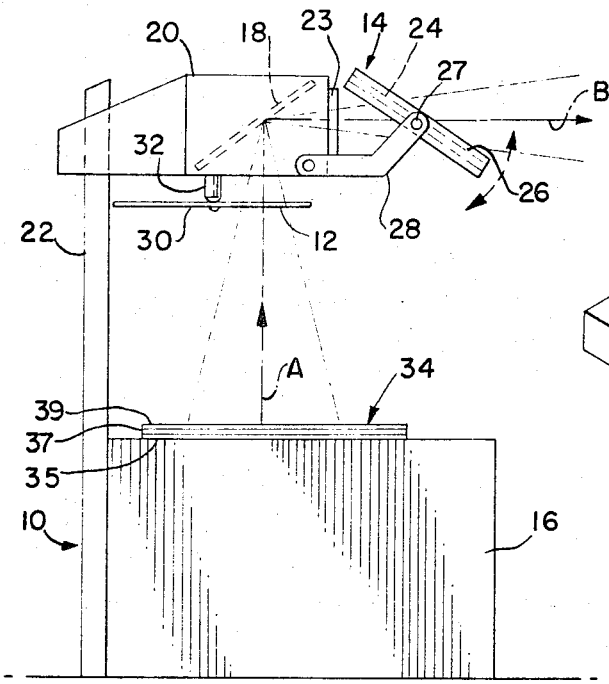
FIG. 1 is a side view of an overhead projector embodying features of the invention.

Referring to FIG. 1, a conventional overhead projector 10 is shown having a rotary sheet or disc 12 and lens element 14 mounted thereon for producing animation in accordance with the present invention. The projector 10 includes a lower housing 16 enclosing the light source, reflector and condenser (not shown) for producing the beam of light which passes upwardly through a glass window in the upper surface of the housing 16. The main optical axis of this beam of light is indicated by the arrow A, and it is focused on a mirror 18 pivotally mounted in an upper housing 20.

The housing 20 is slidably mounted on a column or post 22 fixed to the housing 16 so that the height of the housing 20 can be adjusted for focusing. The mirror 18 reflects the light through an opening defined by a cylindrical flange 23 through the lens element 14, and onto the screen or other surface on which the picture is projected. The main optical axis of this light is indicated by the arrow B.

The lens element 14 comprises a rectangular layer or sheet 24 of an optically inactive material such as clear glass or a clear transparent plastic material. Clear cellulose acetate is one example of such a plastic material. The layer 24 is retained in a rectangular frame 26 having a pin 27 projecting from each side thereof for pivotally supporting the lens between a pair of arms 28 (one of which is shown in FIG. 1). The arms 28 are fixed to and project from the upper housing 20. The lens can be pivoted to various angular positions and is frictionally retained in position. The disc 12 is made of a suitable sheet of material having linearly oriented molecules so as to exhibit birefringent properties. Two such examples would be extruded cellophane or extruded acetate sheets having linearly oriented molecules due to the linear stressing involved in the extrusion process by which they are manufactured. Another example, would be an optically inactive material, such as a cast acetate, embossed with parallel lines in accordance with the teaching of my aforementioned patent to linearly orient the molecules. The foregoing non-polarized materials which exhibit birefringent-like properties hereinafter in the specification and claims shall be referred to as birefringent-like materials. The disc 12 is fixed on the output shaft 30 of a small electric motor driven reduction unit 32 mounted on the underside of the housing 20. The disc 12 is positioned so that all of the light from the lower housing 16 passes through one side of the disc.

If an ordinary transparency is to be projected on the screen without animation, it is positioned on the upper surface of the lower housing 16 in a conventional manner and projected on the screen without interference regardless of whether the disc 12 is rotating. However, when the projected picture is not being animated, the motor unit 32 would normally be denergized, and the lens element 14 pivoted to a position wherein it is perpendicular to the main optical axis B.

To project an animated picture, the motor unit 32 is energized to rotate the disc 12 and the lens element 14 is positioned at an acute angle relative to the main optical axis B as shown in FIG. 1. It has been found that to obtain a desirable intensity of animation, the acute angle should be less than about 45° and that optimum results are obtained when the acute angle is about 36°. The intensity of the animation can be varied by varying the acute angle of the lens element relative to the main optical axis B.

To achieve the animation, the transparency having the art work thereon also must be combined with the remaining motion producing elements disclosed in the aforementioned prior art patents other than the rotary polarizer. In accordance with the teaching of my earlier patent, for example, a three-ply laminated slide 34 may be used. As shown in FIG. 1, the thickness of the slide 34 is exaggerated for the sake of clarity. It comprises a transparency 35 having the picture to be projected, a sheet 37 of polarized material and a thin plastic sheet 39 embossed with the desired pattern of light intercepting motion line as described in my earlier patent. The polarized sheet 37 is sandwiched between the transparency 35 and the motion sheet 39 and, as viewed in FIG. 1, the transparency rests on the upper surface of the housing 16. With this arrangement the picture projected on the screen or other surface is animated with maximum brightness as compared to the prior art systems employing a polarized disc in place of the disc 12.

Figure 2:
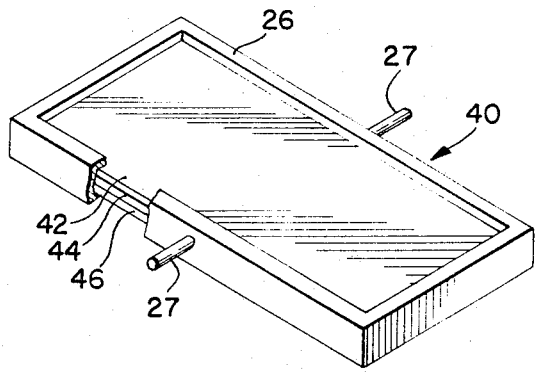
FIG. 2 is an enlarged perspective view illustrating a modification of the lens element shown in FIG. 1.

Referring to FIG. 2, a lens element 40 is shown which is a modification of the lens element 14 in that it has three layers 42-46 of the aforementioned optically inactive material retained in the rectangular frame 26 instead of the single layer 24. It has been found that a lens element with a plurality of layers of optically inactive material provides an improved maximum intensity of animation for a given total layer thickness.

Figure 3:
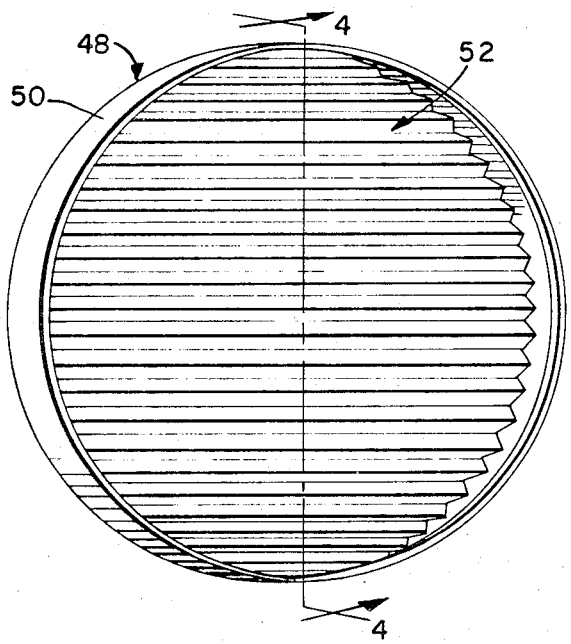
FIG. 3 is a perspective view illustrating another embodiment of the lens element.
Figure 4:
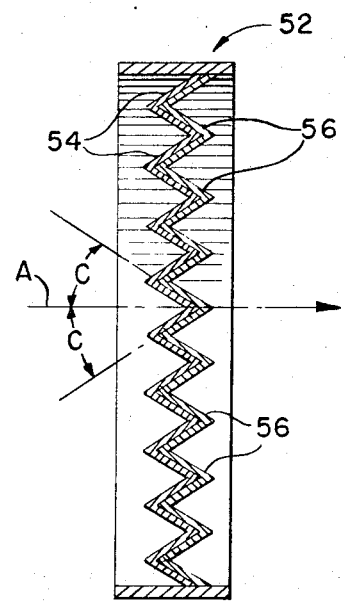
FIG. 4 is the sectional view taken along the line 4—4 of FIG. 3.

Referring to FIGS. 3 and 4, a lens element 48 is shown which illustrates a more compact embodiment. It comprises a cylindrical frame 50 which encircles a laminated, corrugated layer 52 of the aforementioned optically inactive material. As best seen in FIG. 4, the corrugations are formed by alternate parallel strips 54 interconnected by parallel strips 56. All of the strips 54 and 56 are positioned at the same acute angle C relative to the main optical axis of the light passing through the lens as indicated by arrows A. The circular flange 52 is designed to be mounted directly on the flange 23 of the housing 20. This provides a very compact lens arrangement which can be used in place of the lens element 14 and arms 28 of FIG. 1. The acute angle C of FIG. 4 is the aforementioned optimum angle of 36°, because the lens element is not angularly adjustable.

Figure 5:
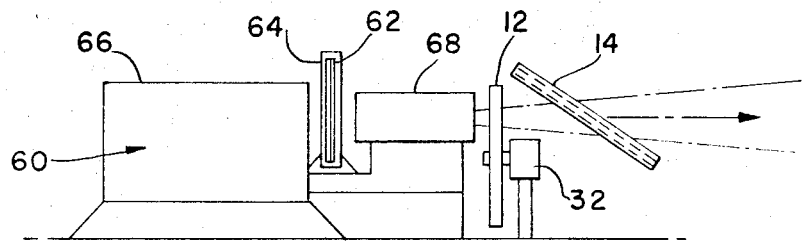
FIG. 5 is a side view of a slide projector embodying features of the invention.

Referring to FIG. 5, a conventional slide projector 60 is shown schematically with the rotary disc 12 and the lens element 14 positioned in front of the projector to animate the picture being projected. The slide 62 is shown in the slide slot 64 of the projector and, in order to produce the animation, the slide would have to be similar to the laminated slide 34 of FIG. 1, for example. The polarized sheet 35 of the three-ply lamination would face the housing 66 which encloses the light source and condenser, and the embossed motion sheet 39 would face the cylindrical housing 68 which encloses the lens elements of the projector.

If desired, other prior art arrangements can be used in place of the laminated slide or sheet 34. For example, the motion sheet disclosed in the aforementioned Yates patent can be employed wherein small pieces of polarized material could be bonded to the transparency having the picture to be animated. The pieces of polarized material would be oriented relative to one another and would overlie those portions of the picture to be animated as taught by Yates. Alternatively, small pieces of polarized material could be bonded to a clear transparent plastic carrier sheet which, in turn, could be bonded to the transparency so that the oriented polarized pieces would overlie the portions of the picture to be animated as also taught by Yates.

Figure 6:
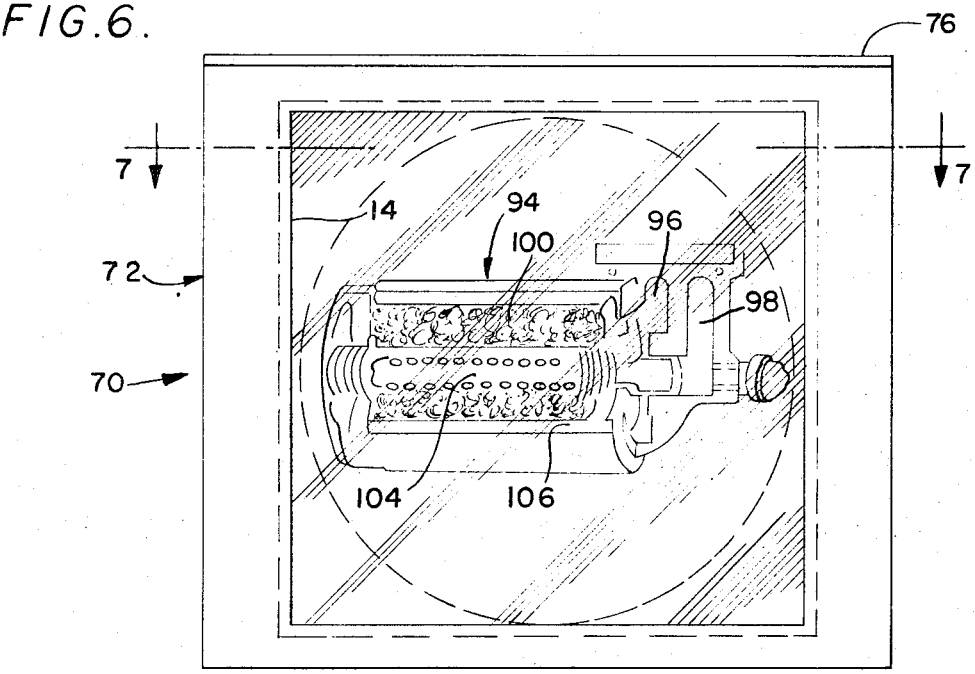
FIG. 6 is a front view of a display device illustrating another embodiment of the invention.
Figure 7:
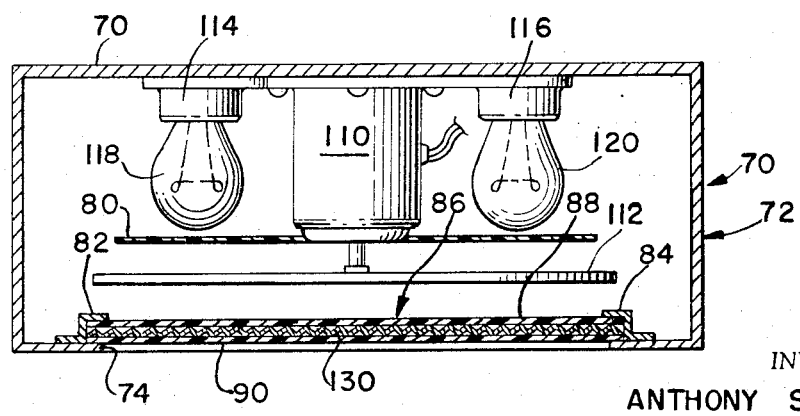
FIG. 7 is a sectional view taken along the line 7—7 of FIG. 6.

Referring to FIG. 6, a display device 70 is shown which illustrates an embodiment of the invention which does not involve projectors. It comprises a light box 72 having a rectangular window opening 74 in the front wall. The top wall of the box 72 is formed by a lid 76 pivotally mounted on the back wall 78 of the box by hinges (not shown) to facilitate replacement of the picture being animated, as will be described.

A thin washer shaped sheet 80 of polarized material is fixed on the motor 110 in position to polarize the light from the light bulbs 118 and 120. A pair of angle shaped elements 82 and 84 are fixed on the inside of the front wall along the vertical slides of the opening 74 for slidably receiving a slide 86 having the picture to be animated. The slide 86 comprises a light intercepting sheet 88 and a transparent sheet 90 bonded together only along their upper marginal edges. The angle elements 82 and 84 are open at their upper ends to enable the slide 86 to be removed from above when the lid 60 is open. The thicknesses of the polarized sheet 80, the light intercepting sheet 88 and the transparent sheet 90 is greatly exaggerated in FIG. 8 for purposes of clarity. By way of example, in the embodiment illustrated, the polarized sheet 80 and transparent sheet 90 are thin plastic sheets each having a thickness of about 0.005 inches. The light intercepting sheet 88 also is a thin plastic sheet having a thickness of about 0.010 inches. The art work or picture to be animated is painted on the transparent sheet 90.

In the embodiment illustrated, the picture painted on the transparent sheet is a filter 94 drawn partially in section to expose the internal parts thereof. The filter 94 has an inlet port 96 and an outlet port 98. A hollow core of filter material 100 has a central bore therethrough covered by a porous sleeve 104. An annular cavity 106 surrounds the filter material 100 and communicates with the inlet port 96. The interior of the porous sleeve 104 communicates with the outlet port 98. Thus fluid enters the inlet port 96, flows into the annular cavity 104, through the porous sleeve 102 filtering material 100, through the porous sleeve 104, into the central bore 106 and out through the outlet port 98. It is this fluid flow which is animated, as will be described.

An electric motor driven reduction unit 110 is mounted inside the box 72 on the back wall 78 in alignment with the center of the opening 74. A thin sheet or disc 112 is mounted on the output shaft of the motor unit 110 in position to overlie the opening 74, as best seen in FIG. 6. The disc 112 is made of the same material as the disc 12 of FIG. 1. The motor unit 110 rotates the disc 112 at about 60 rpm. A pair of conventional electric light sockets 114 and 116 are mounted on the back wall 78 for receiving light bulbs 118 and 120 which transmit light through the disc 112, the slide 86 and the stationary polarized sheet 80 to illuminate the picture.

The display device 70 as just described is similar to the display device disclosed in my prior U.S. Pat. No. 3,609,003 entitled "Animated Display Device" with the exception that the display device of my copending application employs a polarized disc in place of the disc 112 having the linearly oriented molecules. In accordance with the present invention, in addition to employing the birefringent-like material for the disc 112 rather than the polarized material, a lens element 130 is interposed between the sheets 88 and 90 of the slide 86. The lens element 130 is identical to the lens element 52 illustrated in FIGS. 3 and 4 with the exception that it is rectangular rather than circular. It remains fixed between the angles 82 and 84 when the slide 86 is withdrawn and replaced by another slide.

When the disc 112 is rotated with the lights on, traveling shadows are produced which appear to animate the oil filter. The oil appears to flow into the inlet port 96 and the annular cavity 104, scatter its way through the filter material 100 and flow out the central bore 106 and the outlet port 98. By changing the slide 26 different pictures can be positioned in the box 72 which will be illuminated and animated in accordance with the pattern of the motion lines embossed on the light intercepting sheet 98 of the slide.

What is claimed is:

1. An animated display system comprising a light source, a picture positioned to be illuminated by said light source, and means in the path of light from said light source for animating said picture, said means characterized by a single layer or sheet of light-polarized material and comprising a rotary sheet of birefringent-like material, and a layer of optically inactive material positioned at an acute angle relative to the light passing therethrough.

2. The animated display system as defined in claim 1 wherein said layer of optically inactive material is adjustable to vary said acute angle whereby the intensity of animation can be varied.

3. The animated display system as defined in claim 1 wherein said acute angle is about 36°.

4. The invention as defined in claim 1 wherein said layer is made of glass.

5. The invention as defined in claim 1 wherein said layer is made of plastic material.

6. The invention as defined in claim 1 including a plurality of layers of optically inactive material forming a lens element generally defining a plane substantially perpendicular to said light path, each of said layers being positioned at said acute angle relative to the path of light.

7. The invention as defined in claim 6 wherein the acute angle of each of said layers relative to said light path is less than about 45°.

8. The invention as defined in claim 7 wherein said layers form a corrugated lens element with each layer positioned at an angle relative to the layers immediately adjacent thereto.

9. The invention as defined in claim 1 including a projector having said light source as a component thereof, and wherein said picture is a transparency mounted on the projector in position to be projected on a surface.

10. An animated projection display system comprising a projector for projecting a picture on a surface, and means in the path of light of said projector for animating said picture, said means characterized by a single sheet of light-polarizing material and comprising a rotary sheet of birefringent-like material, and a lens element having a layer of optically inactive material positioned at an acute angle relative to the light passing therethrough.

11. The system as defined in claim 10 wherein said lens element is adjustable to vary said acute angle whereby the intensity of animation can be varied.

12. The system as defined in claim 10 wherein said acute angle is about 36°.

13. The invention as defined in claim 10 including a plurality of layers of optically inactive material forming a lens element generally defining a plane substantially perpendicular to said light path, each of said layers being positioned at said acute angle relative to the path of light.

14. The invention as defined in claim 13 wherein said layers form a corrugated lens element with each layer positioned at an acute angle relative to the layers immediately adjacent thereto.

* * * * *